Patented Dec. 7, 1943

2,336,448

UNITED STATES PATENT OFFICE 2,336,448

PHOSPHORIC ACID COMPOSITION

Edwin Cox, Richmond, Va., assignor to Virginia-Carolina Chemical Corporation, Richmond, Va., a corporation of Virginia No Drawing. Application April 1, 1940,
Serial No. 327,363

6 Claims. (Cl. 23—165)

This invention pertains to a composition comprising phosphoric acid that is non-toxic in food for animals. The composition may be used in ensilage preservation without destroying desirable bacterial action, particularly such action as is involved in preserving leguminous and grass ensilage. The composition, moreover, is non-corrosive of metals.

Toxicity of foodstuffs is correlated to physical-chemical disturbances in normal life processes of the animal. These disturbances may be manifested by changes in blood pressure or in deterioration of the bone marrow or in impaired muscle tone or in cardiac impairment. Two types of toxicity development are recognized—acute toxicity resulting from lethal doses and chronic toxicity resulting from accumulated doses. Foodstuffs must not contribute to cumulative impairment of the animal functions any more than to acute poisoning.

In preserving foodstuffs for animals, current attention is being given to preparing ensilage from grasses or from alfalfa or soya. This may be designated as grass and leguminous ensilage to distinguish from ensilage from corn stalks. This type of ensilage has high nutritive value in proteins and vitamins, but requires for its preservation the addition of acid substances or materials that form acids. Characteristic of the decomposition of protein bodies is the formation of amino compounds.

Amino compounds may be regarded as substitution products of ammonia $NH_3$. The pharmacological action of amines is not clear in relationship to chemical structure. In general they act as respiratory and nervous system stimulants.

A purpose of this invention is to present a composition of phosphoric acid containing certain amines that will neither impair the course of desired bacterial action in formation of grass and leguminous ensilage nor corrode the metal cutters or other metal apparatus which the acid may contact. Further, a purpose of the invention is to provide a composition that shall not be toxic to the animals that consume the ensilage nor produce toxic compounds from the ensilage nor result in an ensilage product that animals would be reluctant to consume either because of being malodorous or being distasteful. Further, a purpose of the invention is to provide a compound that when used in ensilage shall not ultimately render distasteful or malodorous milk from cows eating the ensilage. Further, a purpose of the invention is to minimize or prevent the attack of phosphoric acid on metals.

In accordance with this invention a new composition is prepared comprising amine phosphate which is useful for the enumerated purposes and for many other purposes. Preferably, the composition comprises phosphoric acid containing aliphatic amines in which the aliphatic groups may contain four, five or six carbon atoms. Specifically preferred are the tertiary or tri-amines of such compounds. These are designated as butyl amine, amyl amine and hexyl amine; and preferably comprise both normal and iso-compounds.

It is within the scope of this invention to combine with phosphoric acid an amine in which one of these aliphatic groups may be contained with one or more of the others of these aliphatic groups. Thus, for example, there may be a butyl group and two amyl groups or two amyl groups and a hexyl group or such other combinations as may be selected, but preferably the amine is a tri-amine and the aliphatic group may be in part of the iso-form. Particularly preferred is triamyl amine containing iso-triamyl amine. The concentration of triamyl amine in phosphoric acid, for example, may range from about .01 to 1% and the concentration of other amines will be generally of the same order. In a further description of this invention tri-amyl amine will be taken as illustrative of the other amines mentioned or combinations thereof when utilized with phosphoric acid.

Commercial phosphoric acid manufactured by the wet process contains various amounts of fluorine compounds. If considerable fluorine is present it is advantageous to include .03% to 1% of triamylamine with the phosphoric acid. On the other hand, technical phosphoric acid, which is relatively free from fluorine compounds, may contain less than 0.5% triamylamine. These proportions may vary. By way of specific example, a satisfactory composition results from technical phosphoric acid containing 0.2% n-triamylamine, and from commercial phosphoric acid containing 0.3% n-triamylamine.

Also, in this description the term triamylamine includes not only n-triamylamine but also iso-triamylamine. In fact, the use of mixtures of n-triamylamine with isotriamylamine is preferable to that of pure n-triamylamine. To some degree, instead of the tri-substituted amine, the mono- or the di-substituted amyl amines may form useful compositions in phosphoric acid.

When this composition comprising phosphoric acid is contained in grass or legume ensilage, desirable bacterial action proceeds.

In some applications the present composition of phosphoric acid containing triamylamine is useful for other purposes than the preparation of non-toxic animal foodstuffs or is useful prior to actual intermixture of the phosphoric acid composition with the ensilage material. Thus, phosphoric acid generally has been shipped in wooden containers or in glass containers, or in rubber-lined drums or tank cars. However, phosphoric acid containing triamylamine may be shipped and stored in steel drums without causing appreciable introduction into the phosphoric acid composition of iron compounds. Thus a mixture of commercial phosphoric acid in which the flourine content is of the order of 100 to 200 parts per million (0.01–0.02%) containing 0.2% n-triamylamine was stored for 114 days in light steel drums and the acid analyzed for iron at the end of seven days and at the end of 114 days. Initially, there was a very slight evolution of hydrogen, but a test showed that at the end of the first seven days a drum had lost only 0.82 milligram of iron per square centimeter of surface for 24 hours, while within the next 107 days, this loss was only 0.19. Practical experience has shown that 0.3% commercial triamylamine is suitable in admixture with commercial phosphoric acid in which the fluorine content is, for example, about 100 to 200 parts per million (0.01%–0.02%) and 0.2% and less are sufficient with technical acids of low fluorine content to permit the use of light gauge steel drums. To some degree, copper, Monel metal, zinc or aluminum likewise by use of triamylamine are kept from entering into phosphoric acid solution with which they may be in contact. Substantial quantities of these metals, for example dissolved copper, would be undesirable in foodstuffs.

This inhibited phosphoric acid is useful also for the cleaning of metals where the removal of acid soluble films or substances is desirable without the corrosion of the metal, such as the cleaning of steel railroad cars, removal of scale from boiler tubes and pipes, the cleaning of dairy equipment and the cleaning of buildings.

Thus the present composition is highly desirable and useful, particularly so since the great number of materials which have been introduced into acids to minimize solution of metals therein have been of toxic nature. But the present composition of phosphoric acid is useful not only to prevent the corrosion of metals, particularly ferrous metals, but also is useful in preparation of foodstuffs. Moreover, in the case of leguminous ensilage this composition functions without preventing requisite bacteriological action.

While in accordance with the patent statutes, I have described a preferred embodiment of this invention, it will now be apparent to those skilled in the art that alterations and modifications may be made within the scope of the appended claims.

What I claim is:

1. In combination, means providing a metallic surface susceptible to corrosion by phosphoric acid, and phosphoric acid containing a small quantity of n-triamylamine phosphate, in contact with said surface, said combination being characterized by reactive inertness between said acid and said metallic surface.

2. In combination, means providing a ferrous metallic surface susceptible to corrosion by phosphoric acid, and phosphoric acid containing a small quantity of n-triamylamine phosphate, in contact with said surface, said combination being characterized by reactive inertness between said acid and said metallic surface.

3. In combination, means providing a metallic surface susceptible to corrosion by phosphoric acid, and technical phosphoric acid incorporated with the reaction product of said acid and from 0.1% to 1.0% of n-triamylamine, in contact with said surface, said combination being characterized by reactive inertness between said acid and said metallic surface.

4. In combination, means providing a ferrous metallic surface susceptible to corrosion by phosphoric acid, and technical phosphoric acid incorporated with the reaction product of said acid and from 0.1% to 1.0% of n-triamylamine, in contact with said surface, said combination being characterized by reactive inertness between said acid and said metallic surface.

5. Method of protecting metallic surfaces from the corrosive reaction of phosphoric acid contacting said surfaces, comprising incorporating in said acid a relatively small proportion of n-triamylamine phosphate, sufficient to protectively coat the surface contacted by the acid.

6. Method of protecting metallic surfaces from the corrosive reaction of phosphoric acid contacting said surfaces, comprising incorporating in a relatively large quantity of said acid a relatively small quantity of n-triamylamine, at least sufficient to form by reaction with said acid enough triamylamine phosphate to protectively coat the surface contacted by the acid.

EDWIN COX.